Oct. 31, 1967    J. A. DI LEO ET AL    3,350,669
TEMPERATURE TRANSDUCER HAVING SUPERCONDUCTING WINDING
Filed Dec. 11, 1964
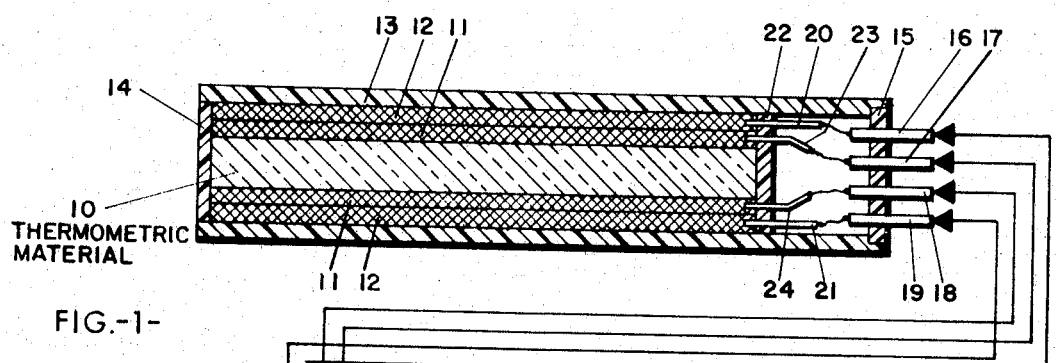
FIG.-1-
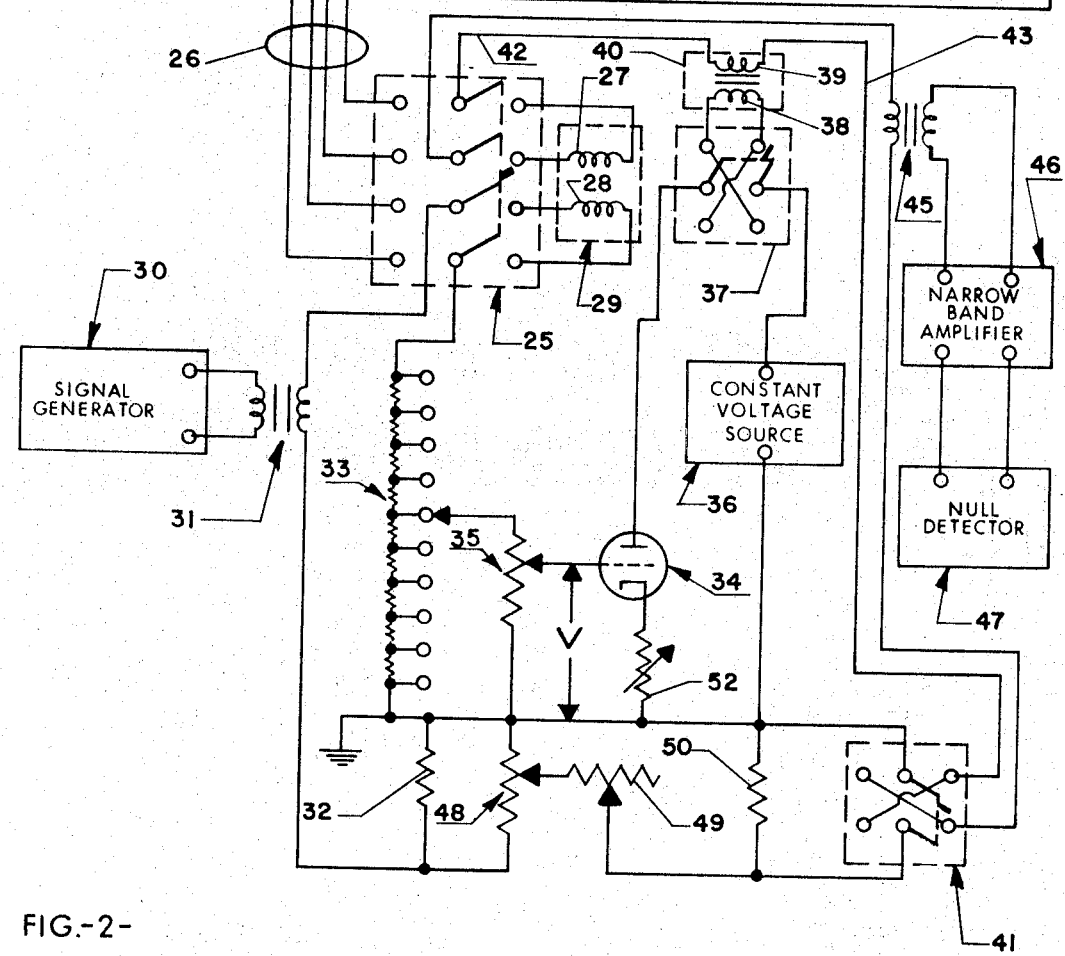
FIG.-2-
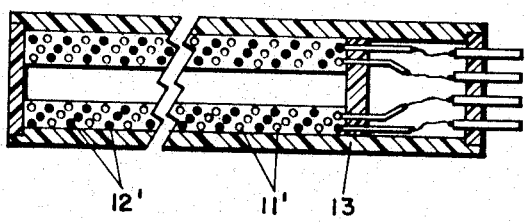
INVENTOR.
JOSEPH A. DILEO
JAMES J. DRAUTMAN
BY Rudolph J. Jurick
ATTORNEY United States Patent Office 3,350,669
Patented Oct. 31, 1967

3,350,669
TEMPERATURE TRANSDUCER HAVING SUPERCONDUCTING WINDING
Joseph A. DiLeo, High Bridge, N.J., and James J. Drautman, Jamison, Pa., assignors to Malaker Laboratories, Inc., High Bridge, N.J., a corporation of New Jersey
Filed Dec. 11, 1964, Ser. No. 417,733
2 Claims. (Cl. 335—216)

This invention relates to transducers of the class comprising a pair of electrical windings the mutual inductance of which varies in correspondence with changes in a condition to be measured or controlled and more particularly to a transducer adapted for making measurements in the lower range of cryogenic temperatures.

A transducer made in accordance with this invention is adaptable for use in any mutual inductance measuring arrangement wherein the variable parameter is the magnetic susceptibility of a thermometric material. However, the device is particularly useful in the form of a sensing probe responsive to changes of temperature in the lower range of cryogenic temperatures.

In a more specific sense, the sensing probe is constructed and arranged to obtain temperature measurements in a Dewar flask, or tank, containing a cryogenic fluid, with a minimum of power dissipation. Thus, the range of temperature measurements can be extended down to the lower range of cryogenic temperature, specifically, 1° K. and down, with a minimal error due to self-heating of the sensing elements and a minimal loss of liquid cryogen due to heat produced in the sensing probe. Briefly, the probe comprises a pair of windings wound in close proximity and sharing a common thermometric material. One, or both, of these windings are made of a material which is a superconductor at cryogenic temperatures, which can be drawn into a wire form, and which exhibits properties of self-inductance. Such wires are wound as the primary and/or secondary of a mutual inductance, the value of which depends upon the temperature of the thermometric material magnetically coupled thereto.

An object of this invention is the provision of a transducer of the class comprising a pair of windings magnetically coupled to a thermometric material, which transducer is particularly adapted for use at cryogenic temperatures.

An object of this invention is the provision of a transducer of novel construction whereby the transducer is precisely responsive to temperature changes in the range of 0–1° K. and which can be utilized at higher temperatures as well.

An object of this invention is the provision of a temperature-responsive transducer having a thermometric material magnetically coupled to a pair of windings, one or both of the windings being made of a material which is a superconductor at cryogenic temperatures.

An object of this invention is the provision of a temperature-sensitive probe comprising a thermometric material and a pair of windings arranged so that the mutual inductance between the windings varies in accordance with the magnetic susceptibility of said material, at least one of the windings being made of a material which is superconducting at cryogenic temperatures, thereby to minimize the self-heating effect of the probe.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a longitudinal, cross-sectional view of a sensing probe made in accordance with this invention and including a schematic diagram of a simple circuit for use in connection therewith; and FIGURE 2 is a longitudinal, cross-sectional view showing a modification of the probe windings.

Referring to FIGURE 1, the probe comprises a cylindrical rod 10, of thermometric material, by which is meant a paramagnetic material the magnetic susceptibility of which changes with temperature such as, for example, a natural or synthetic ruby. Distributed over the rod 10 is a secondary winding 11 and a primary winding 12, the assembly being housed in a tubular shell 13 made of a suitable plastic. One end of the shell is closed by a thin plastic plug 14 secured in place by a suitable cement. The other end of the shell is closed by an insulator plug 15 carrying connecting prongs 16–19 for connecting the probe to an electrical circuit. The ends of the primary winding 12 are connected to the pins 20, 21, carried by an insulating bushing 22, which pins are connected to the respective prongs 16 and 19 by flexible leads. Similarly, the ends of the secondary winding 11 are connected to the pins 23 and 24 which also are connected to the associated prongs 17 and 18 by flexible leads.

The primary winding 12 is made of a selected superconducting material which can be drawn into a wire form and which manifests the property of self-inductance when wound into a single or multi-layer winding. A selection of the superconducting material is made with consideration given to the range of temperature measurements to be made with the particular probe. Such temperature range will extend from 0° K. to that temperature at which the selected material ceases to be superconducting. The secondary winding 11 in most applications may be made of copper wire.

The primary and secondary windings constitute two self-inductances wound in close proximity and magnetically coupled to the common rod 10. In actual use of the probe, the primary winding is energized by a voltage of sinusoidal waveform and having a precise frequency. The secondary winding is supplied with a current at the same precise frequency. The mutual coupling between the two windings conforms to the normal equations for mutual coupling between self-inductances and balance is obtained at some mutual inductance value, which is dependent upon temperature, by varying the magnitude of the current flowing in the secondary winding.

When the probe is inserted into a vessel containing a cryogenic fluid, or attached to a vessel which can be maintained at a low temperature, the resistance of the superconducting winding reduces to zero and the heat losses disappear. Thus, a wattless power, that is, a power which is returned to the source during each cycle, is dissipated in the primary winding. This zero power requirement is most important in temperature measurements in the cryogenic temperature range. The only power loss in the probe is that arising by reason of the balancing current flowing in the secondary winding, which current has a small magnitude compared to that usually required in a primary winding made of normal, non-superconducting wire.

A reduction in power requirements of greater than 100 times is obtained by using a primary winding of superconducting material, whereby the range of temperature measurement can be extended down to the lower range of cryogenic temperatures (that is, 1° K. and down), with a minimal error due to self-heating of the probe.

Since a layer of superconducting wire becomes a good magnetic shield when energized by an A.C. or D.C. voltage, it is necessary to arrange the primary winding so that its magnetic field will encompass those variables which are necessary for temperature measurements. Specifically, both the secondary winding and the thermometric material, which is affected by the change in temperature, must be physically disposed within the magnetic field generated by the flow of current through the superconducting primary winding. This requirement is met by the construction shown in FIGURE 1, wherein the primary winding 12 encircles the secondary winding 11 and the thermometric rod 10.

FIGURE 2 illustrates a modification of the probe construction wherein the superconducting primary winding 12' and the copper secondary winding 11' are wound in side by side relation. Here, the primary winding turns are represented by the solid dots whereas the turns of the secondary winding are represented by the small circles for purposes of clarity. This arrangement results in a greater mutual inductance between the windings when the primary is in its superconducting state. Consequently, the sensitivity of the probe to changes in the magnetic susceptibility of the thermometric material is increased considerably.

Reference again is made to FIGURE 1, wherein there is shown a simple circuit for measuring cryogenic temperatures. The probe windings are connected to the left, stationary contacts of a 4-pole, double throw switch 25, through a suitable cable 26. The right, stationary contacts of this switch are connected, individually, to two coils 27 and 28 of a standard inductance 29. Closure of the switch to the left or to the right connects the probe windings or the standard inductance coils to a source of A.C. voltage and to an electronic bridge circuit.

An A.C. signal voltage, generated by a signal generator 30, is applied across the primary winding 12 of the probe, through an input transformer 31, a fixed resistor 32 and a decade potentiometer 33. An adjustable voltage, taken from the potentiometer 33, is applied to the control grid of a triode tube 34 through a fine-adjustment potentiometer 35, said tube being operated on the linear region of its characteristic. The voltage for the anode circuit of the tube is supplied by a constant voltage source 36 through a reversing switch 37 and the primary winding 38 of a balancing mutual inductance 40. This inductance has its secondary coil 39 connected between the 4-pole switch 25 and a second reversing switch 41 by the respective leads 42 and 43.

Included in the secondary circuit (which comprises either the secondary winding 11 of the probe or the secondary coil 39, of the balancing mutual inductance 40, depending upon the closure of the switch 25), is an output transformer 45. Such transformer supplies a signal to a narrow band amplifier 46, tuned to the frequency of the signal generator 30. The output of the amplifier is fed to a suitable null detector 47, which may be an indicating meter, oscilloscope, etc.

It will be noted that the anode current of the tube 34 flows through the primary coil 38 of the balancing mutual inductance 40. The effective voltage (V), between the grid of the tube and ground, determines the magnitude of the A.C. voltage component of the anode circuit. The value of the voltage (V) depends upon the setting of the potentiometers 33 and 35. Thus, by adjusting these potentiometers, one can adjust the level of the voltage induced in the secondary coil 39 of the balancing mutual inductance 40. This allows for a balancing out of the inductive component of the mutual inductance of the probe or the standard inductance 29. The quadrature component of the potential induced in the secondary circuit can be balanced out by means of a resistance network comprising the potentiometer 48, the adjustable resistor 49 and the fixed resistors 32 and 50. This permits one to inject a small out-of-phase potential directly from the primary circuit into the secondary circuit.

In operation, the potentiometers 33 and 35, the potentiometer 48 and the adjustable resistor 49 are adjusted so that both the inductive and the resistive components of the mutual inductance of the probe are balanced to a null. The two reversing switches 37 and 41, in the inductive and resistive networks, respectively, make it possible to change the sign of the balancing components injected into the probe.

The purpose of the standard inductance 29 is to provide a means for setting the tube 34 at a reproducible operating point in its characteristic. This is accomplished as follows. The 4-pole switch 25 is closed to the right, thereby connecting the standard inductance 29 into the circuit. The potentiometers 33 and 35 are then set to predetermined calibrating values as, for example, 50 ohms on the potentiometer 33 and 5000 ohms on the potentiometer 35. A bridge balance is then obtained by varying the bias voltage on the tube by means of the variable cathode resistor 52 and by simultaneously adjusting the potentiometer 48 and adjustable resistor 49. Once such bridge balance has been obtained, the cathode resistor 52 is locked in position and the 4-pole switch 25 is closed to the left, thereby connecting the probe into the bridge circuit for temperature measurement purposes.

The mutual inductance of the probe windings varies with the magnetic susceptibility of the thermometric material which, in turn, varies with temperature. The circuit is pre-calibrated for use with a particular probe. When the probe is inserted into a cryogenic liquid, a change in the mutual inductance between the probe primary and secondary windings results in a corresponding change in the current flow through the secondary coil 39, of the balancing mutual inductance, and the primary coil in the output transformer 45, resulting in a deflection of the null detector 47. To re-establish a balanced circuit condition, the potentiometers 33 and 35 are adjusted to effect a necessary change in the voltage (V). It will be clear that these potentiometers can be provided with suitably calibrated scales whereby the settings thereof provide a direct reading of the temperature to which the probe is subjected.

As described hereinabove, the range of temperature measurement is from 0° K. to that temperature at which the particular material of the probe primary winding ceases to be superconducting. The precise measurement of temperatures in the range of 0–1° K. is made possible by the elimination of any heating of the primary winding. The heat developed in the copper secondary winding is of such a low order as to be insignificant in most applications. However, to meet the requirements of certain critical applications, all heating within the probe can be eliminated by also making the secondary winding of superconductivity material.

Having now described the invention, those skilled in this art will be able to make various changes and modifications without thereby departing from the spirit and scope of the invention as recited in the following claims.

We claim:
1. A temperature-sensitive probe comprising,
   (a) a tubular housing,
   (b) an axially-disposed rod carried by the housing, said rod being made of a paramagnetic material, the magnetic susceptibility of which changes with temperature,
   (c) first and second windings carried by the rod in layers, said windings being substantially uniformly distributed along the rod with each layer comprising successive turns of the first winding disposed between successive turns of the second winding, said first winding being made of a material which is a superconductor at cryogenic temperatures, and (d) connection terminals carried by the housing and individually connected to the ends of the windings.

2. The invention as recited in claim 1, wherein the second winding also is made of a material which is a superconductor at cryogenic temperatures.

References Cited

UNITED STATES PATENTS 3,173,079  3/1965  McFee.
3,233,460  2/1966  Daunt et al. _____ 73—362

BERNARD A. GILHEANY, *Primary Examiner.*

G. HARRIS, Jr., *Assistant Examiner.*